April 3, 1951   J. B. TEGARTY   2,547,349
CLOTHESPIN
Filed April 10, 1946

INVENTOR.
JOHN B. TEGARTY
BY
John H. Leonard,
his ATTORNEY

Patented Apr. 3, 1951

2,547,349

UNITED STATES PATENT OFFICE 2,547,349

CLOTHESPIN

John B. Tegarty, Lakewood, Ohio

Application April 10, 1946, Serial No. 660,972

5 Claims. (Cl. 24—137)

1

This invention relates to a new and improved clip particularly adapted for use as a clothespin.

One of the principal objects of the present invention is to provide a unitary clip of organic plastic material in which the stresses are so distributed that the different parts of the clip are not overstressed in use and the clip as a whole retains its resiliency and capabilities of exerting gripping pressure even after long and severe usage.

Another object is to provide a clip of the character described which is adapted to engage a line in a manner most effectively to utilize the pressure it is capable of exerting.

Another object is to provide a clip which can operate effectively with clotheslines of a wide range of diameters.

A more specific object is to provide a clip adapted to engage the line at a plurality of separated points so related to each other that the clip exerts a kinking pressure and torsional stress on the line for holding itself in firm engagement therewith.

Another object is to provide a clip which may be snapped readily onto the line and over the usual thicknesses of clothing or washing to be secured to the line and which, when so engaged, partially embraces the line in a manner to maintain its engagement therewith by an embracing and mechanical interlocking relation to the line as well as by frictional resistance against removal from the line.

Another object is to provide a unitary clip of resilient organic plastic material which is so designed that it can be manufactured at a cost competitive with ordinary clothespins despite the relatively high cost of the plastic material of which it is composed.

Other objects and advantages will become apparent from the following description, wherein reference is made to the drawings, in which Fig. 1 is a perspective view showing the clip installed on a clothesline;

Figure 1:
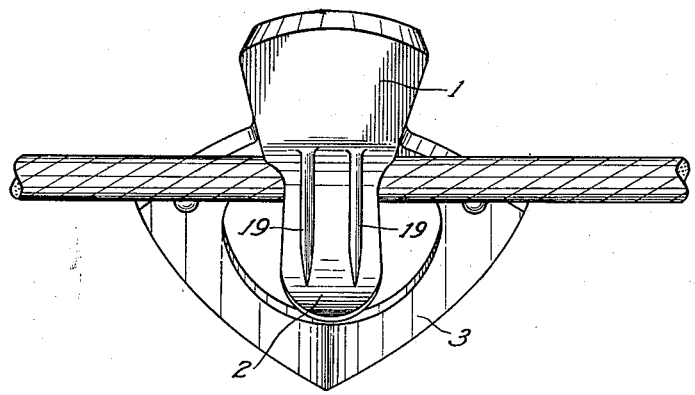
Figure 2:
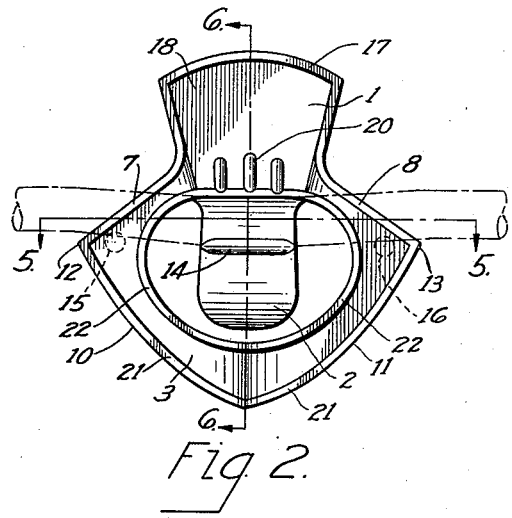
Fig. 2 is a front elevation of the clip, the position of the line therein being indicated by dot dash lines for clearness in illustration.
Figure 6:
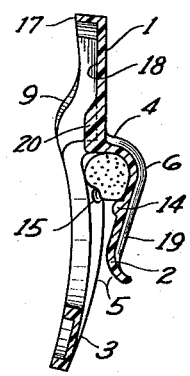
Figure 4:
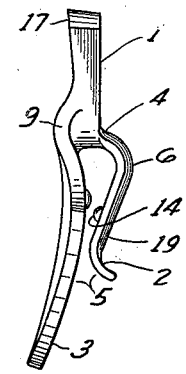
Fig. 4 is an end view of the clip with the line installed.
Figure 5:
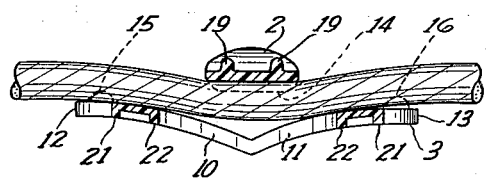

Figs. 5 and 6 are sectional views taken on the lines 5—5 and 6—6, respectively, of Fig. 2.

Heretofore clips of organic plastic material have been made in the same general form as the ordinary wooden clothespin. However, due to the type of material, such organic plastic clothespins have not proven satisfactory. The wooden clothespin and prior plastic clothespins of the same form depend entirely upon direct pinching pressure on the line and resultant frictional resistance for holding the clothes in place thereon. Their engagement with the line exerts a substantial strain on the clothespin at the crotch and, due to the fact that organic plastic material tends to cold flow under strain and to assume a permanent set, such prior plastic clothespins generally either have split at the crotch or the legs thereof have become so spread or permanently deformed that little or no effective gripping pressure remains.

The present clip effects an embracing and mechanical interlock relation under yieldable pressure with the line and the stresses in the clip are so distributed that no portion is subjected to an undue stress which causes cold flowing of the material. As a result the present clip retains its original operating characteristics under long and severe usage.

Referring to the drawings, the clip comprises generally a single piece of organic plastic material having a portion in the form of a head or tab 1 which can be conveniently gripped between the fingers for installing and removing the clip. Depending from the head 1 are a pair of legs 2 and 3 which are spaced apart flatwise from each other and define therebetween, adjacent their juncture with the body, a crotch for accommodating the clothesline and having a base 4. The legs 2 and 3 as a whole are relatively divergent and then convergent part way of their length away from the base 4, as will later be described. The free end portions of the legs 2 and 3 are relatively divergent flatwise of the legs away from the base 4 and toward their free ends, as indicated at 5, so as to guide the line into the crotch and cause the legs to be cammed apart by the line for permitting its ready insertion into the crotch.

The leg 2 is preferably of a considerable width and may be disposed centrally of the body 1 and is concave toward the leg 3 at a portion between the body 1 or base 4 of the crotch and the free end of the leg 2, as indicated at 6. The leg 3 is preferably in the form of an open frame and as a whole is generally convex toward the leg 2 about an axis parallel to the axis of the crotch and concave toward the leg 2 about an axis extending endwise of the legs. More specifically, the leg 3 may comprise upper lateral, or frame, portions 7 and 8, respectively, which extend first abruptly rearwardly from the sides of the body 1, respectively, as indicated at 9, and then extend laterally of the body in opposite directions. The portions 7 and 8 slope generally downwardly or toward the free ends of the legs in diverging relation to each other from their juncture with the body 1.

At their lower ends, the portions 7 and 8 are connected integrally to portions 10 and 11, respectively, which are convergent laterally of the clip and join at the free end of the leg 3.

Figure 3:
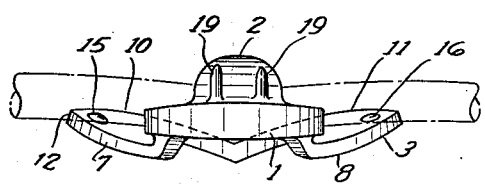
Fig. 3 is a top plan view of the clip with the line installed therein.

The portions 7 and 8, in addition to sloping downwardly and outwardly from the body 1, curve or slope back toward the principal plane of the leg 2, as best illustrated in Figs. 3 and 6, a sufficient distance so that their lateral limits are disposed laterally of the clip beyond the lateral limits of the leg 2 and are disposed endwise of the clip a sufficient distance below the base 4 of the crotch to engage partially beneath a line which is accommodated in the crotch, or slightly below its center-line.

The lateral limits of the arms 7 and 8 preferably are in the form of peaks or relatively sharp edges, indicated at 12 and 13, so as to provide a more effective engagement between them and the underside of a line accommodated in the crotch. In addition, the upwardly exposed edges of the leg portions 7 and 8 extend downwardly endwise of the clip beneath the level of the base 4 of the crotch. Accordingly, when a line is received in the crotch through the divergent free ends of the legs 2 and 3, the legs are stressed apart from each other to permit the line to pass the peaks 12 and 13 after which the lateral portions of the leg 3 spring forwardly and force the line more tightly into the crotch and cause the peaks 12 and 13 to engage beneath the line or on the opposite side of its diameter from the base 4. Due to this engagement and the concavity of the leg 2, as indicated at 6, the legs are in partially embracing relation to the line circumferentially more than 180°. Furthermore, since the upper edges of the leg portions 7 and 8 slope in the manner described, both downwardly and toward the leg 2, those portions of the upper edges near the body 1 force the line forwardly toward the leg 2, and their more outwardly disposed portions force the line toward the base 4 of the crotch.

The leg 2 is relatively rigid, and as a result of the engagement described, the line is subjected to a kinking pressure endwise of the clip and also in a direction fore and aft of the clip. Thus the line is urged to follow a serpentine path lengthwise of the crotch, as best illustrated in Figs. 2 and 5. Necessarily, such serpentine path is provided through the clip in its normal unstressed condition.

The clothesline may be sufficiently taut so that it is not deflected sufficiently to assume as pronounced a serpentine path as illustrated in Figs. 2 and 5, but resultant stress is one tending to kink the line and since the line bears downwardly on the upper edges of the portions 7 and 8 and the peaks 12 and 13 urge it upwardly and toward the leg 2, the line is under some torsional stress which holds it more firmly in engagement with the legs and forces the clip downwardly for more firmly seating the line in the base 4 of the crotch. This torsional stress is counterbalanced by the weight of the clothes secured on the line by the clip so that firm holding engagement is effected.

In order to increase the frictional resistance on the line or the clothes held on the line by the clip, the central leg 2 is provided with a rib 14 which extends transversely of the leg generally parallel to the crotch and is positioned to engage the underside of the line received in the crotch. The rib 14 preferably has an abrupt wall surface exposed to the line accommodated in the crotch so as to more firmly resist camming of the legs apart when a pull is exerted on the body 1.

In order to prevent this camming effect on the leg 3, small bosses 15 and 16 are provided on that face of the leg 3 adjacent the leg 2 and preferably are positioned just below the peaks 12 and 13 or in alignment transversely of the clip therewith. It should be noted that the peaks 12 and 13, as well as the peaks formed by the bosses 15 and 16, lie a short distance below the center line of a clothesline when the line is accommodated in the crotch.

In order to utilize the relatively expensive organic plastic material most effectively, the body 1 preferably has a relatively deep peripheral rib or flange 17 and a very thin web portion 18. Likewise, the central leg 2 is provided with heavy longitudinal ribs 19 which continue through the integral web 18. An additional supplemental rib 20 also is provided on the back of the web 18 between the ribs 19. The leg 3 also has an outer peripheral flange 21 and an inner peripheral flange 22 with a relatively thin web portion therebetween, the outer peripheral flange merging with the peripheral flange 17 of the body 1 and the inner peripheral flange merging with the portion of the flange of the body 1 with which the ribs 19 and 20 are joined or merged. Since the entire clip, including the ribs and flanges, is a single integral resilient structure of resilient organic plastic, it may be sprung readily for operation and supplies sufficient gripping pressure for its intended purposes without overstressing any portion of the clip itself.

Any of the resilient organic plastics, whether thermo-plastic or thermo-setting, may be used, cellulose acetate butyrate being one well known example.

I claim:

1. A clothesline clip comprising a body having depending resilient front and rear legs, respectively, the front leg being wider than the rear leg and the legs as a whole being spaced flatwise from each other and providing therebetween a line receiving crotch adjacent the body and extending laterally of the clip, said legs as a whole being convergent part way toward their free ends to provide a restricted entrance into the crotch and having free end portions which are divergent in the direction away from the crotch, the wider front leg being in the form of a frame having upper frame members extending laterally from the body, with their upper edges, near their outer ends, sloping toward the free ends of the legs in a direction outwardly from the body, said upper frame members terminating at their outer ends at corners which are positioned near to the extended axis of the crotch so as to engage a line, when a line is received in the crotch, beyond the axis of the line in a direction away from the crotch and to tend to kink the portion of the line extending between the corners upwardly at the ends of the crotch, said outer end portions of the upper frame members also sloping back toward the general plane of the narrower rear leg in a direction outwardly laterally of the clip so as to engage said line portion, when the line is received in the crotch, and to tend to kink the said portion of the line backwardly at the ends of the crotch, whereby a compound kink in the line is provided at the portion engaged by the clip.

2. A clothesline clip according to claim 1 characterized in that said frame members have small projections on the face exposed toward the rear leg, which projections are positioned near to said corners.

3. A clothesline clip according to claim 1 characterized in that said rear leg is concave toward the front leg from the base of the crotch part way toward the free end of the rear leg.

4. A clothesline clip according to claim 1 characterized in that said rear leg has a projection positioned to engage a line received in the crotch beyond the axis of the line in a direction away from the crotch.

5. A clothesline clip according to claim 1 characterized in that it is made as a unitary structure of a resilient organic plastic material.

JOHN B. TEGARTY.

REFERENCES CITED

The following references are of record in the file of this patent:

UNITED STATES PATENTS

| Number | Name | Date |
|---|---|---|
| 788,252 | Dalton | Apr. 25, 1905 |
| 1,233,294 | Anderson | July 17, 1917 |
| 1,624,514 | Smith | Apr. 12, 1927 |
| 1,654,756 | Ryan | Jan. 3, 1928 |
| 1,894,121 | Pronnecke | Jan. 10, 1933 |

FOREIGN PATENTS

| Number | Country | Date |
|---|---|---|
| 18,285 | Great Britain | of 1897 |
| 110,520 | Australia | May 2, 1940 |
| 241,151 | Germany | Nov. 27, 1911 |